No. 636,359. Patented Nov. 7, 1899.
C. P. SCHULTZ.
DENTAL ROOT DRILL.
(Application filed Mar. 17, 1899.)

(No Model.)

WITNESSES:
Harry J. Garceau
Andrew J. Pitcher

INVENTOR:
Charles P. Schultz.
BY S. Scholfield.
ATTY.

UNITED STATES PATENT OFFICE.

CHARLES P. SCHULTZ, OF PAWTUCKET, RHODE ISLAND.

DENTAL ROOT-DRILL.

SPECIFICATION forming part of Letters Patent No. 636,359, dated November 7, 1899.

Application filed March 17, 1899. Serial No. 709,543. (No model.)

*To all whom it may concern:*

Be it known that I, CHARLES P. SCHULTZ, a citizen of the United States, residing at Pawtucket, in the county of Providence and State of Rhode Island, have invented a new and useful Improvement in Dental Root-Drills, of which the following is a specification.

Dental root-drills require a special quality of wire to form the fine flexible shank at the rear of the cutting-head of the drill in order to prevent the drill from breaking off in the root of the tooth, and this quality of wire cannot be obtained in an integral drill formed of a piece of homogeneous wire of sufficient size to fit the drill-socket of a dental handpiece; and it is the object of my invention to provide a drill in which the required conditions of flexibility and durability may be complied with; and my invention consists in a dental root-drill formed of a piece of hard-drawn wire, with an enlarged shank portion of hollow wire, and having the exposed portion of the hard-drawn wire tapered to form the flexible point of the drill, so that the drill will include a projecting tapered portion of single hard-drawn wire and a shank portion of compound wire having a core of the hard-drawn wire.

Figure 1:
Figure 2:
Figure 3:
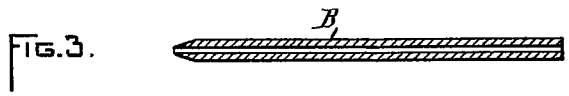
Figure 4:
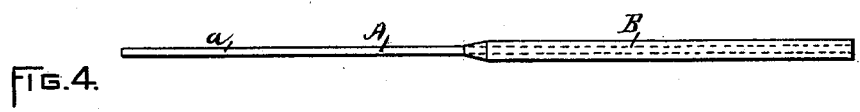
Figure 5:
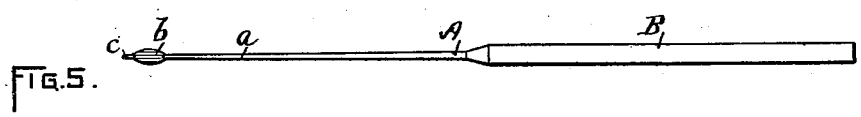
Figure 6:
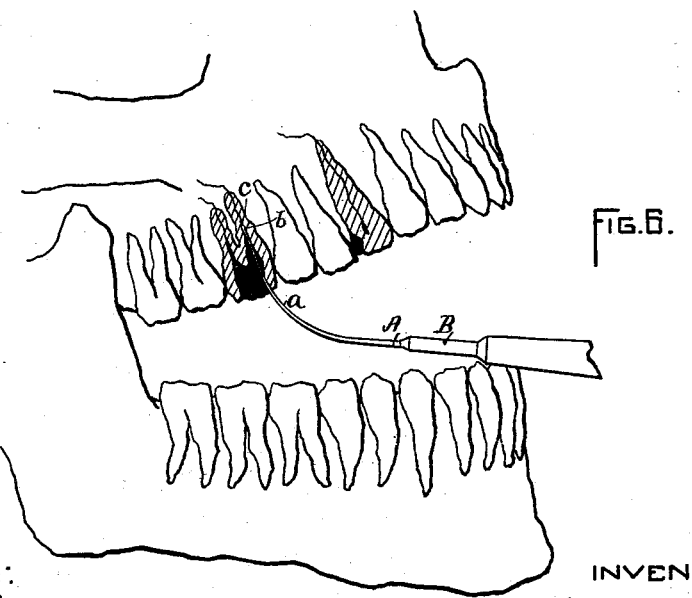

In the accompanying drawings, Figure 1 represents a side view of the completed drill embodying my improvement. Fig. 2 represents a side view of the piece of hard-drawn wire of which the flexible drill is to be formed. Fig. 3 represents a longitudinal section of the tube which, together with the hard-drawn-wire core, forms the compound-wire shank of the drill. Fig. 4 represents a side view showing the tube arranged upon the hard-drawn-wire core to form the compound-wire shank. Fig. 5 represents the projecting portion of the hard-drawn wire as tapered and spread by flattening to form the flexible drill. Fig. 6 represents the operation of the drill upon a hollow tooth.

In the accompanying drawings, A, Fig. 2, represents a piece of hard-drawn wire, preferably of steel, and B, Fig. 3, represents a piece of hollow wire or tube, preferably of brass or other easily-wrought metal, the said tube or hollow wire B being placed upon the end of the hard-drawn wire A and secured thereto by swaging the tube B upon the wire A, thus forming a shank of the proper size of compound wire.

The projecting portion $a$ of the wire A is reduced to a tapering form, as shown in Fig. 5, by suitable means and the wire flattened and spread at $b$ or otherwise shaped to form the cutting portion of the drill. The end $c$ of the drill is made to project beyond the cutting portion $b$ to serve as a guide to the drill and prevent it from leaving the natural channel of the root, and thus cutting a hole outside of the nerve-channel.

The improved dental drill having its enlarged shank formed of a tube or hollow wire attached to the hard-drawn-wire core, as described, provides for the manufacture of a drill which embodies the desirable qualities of flexibility and durability with economy in cost of manufacture.

I claim as my invention—

A dental root-drill, having a shank portion of compound wire, in which the core is of hard-drawn wire, and having the exposed portion of the hard-drawn wire tapered and shaped to form the flexible drill, substantially as described.

CHARLES P. SCHULTZ.

Witnesses:
SOCRATES SCHOLFIELD,
ANDREW J. PITCHER.